(No Model.)

4 Sheets—Sheet 1.

J. C. SEBRING.

COMBINED PLANTER AND CULTIVATOR.

No. 251,301.

Patented Dec. 20, 1881.

Witnesses

Lw. Hopkins

Harry E. Knight

Inventor

Joseph C. Sebring

By Knight Bros

Attys.

N. PETERS. Photo-Lithographer. Washington, D. C.

J. C. SEBRING.
COMBINED PLANTER AND CULTIVATOR.
No. 251,301. Patented Dec. 20, 1881.
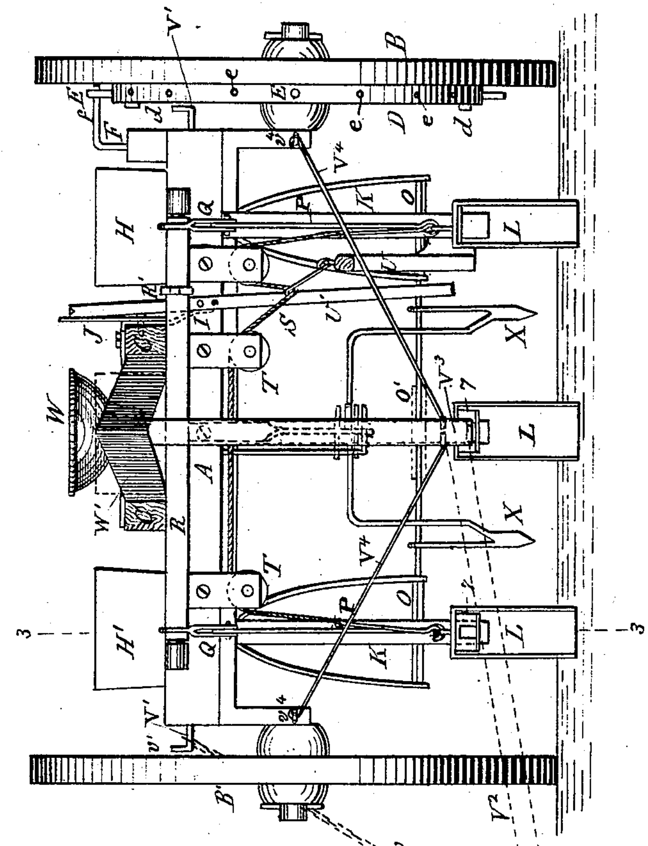
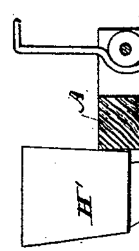
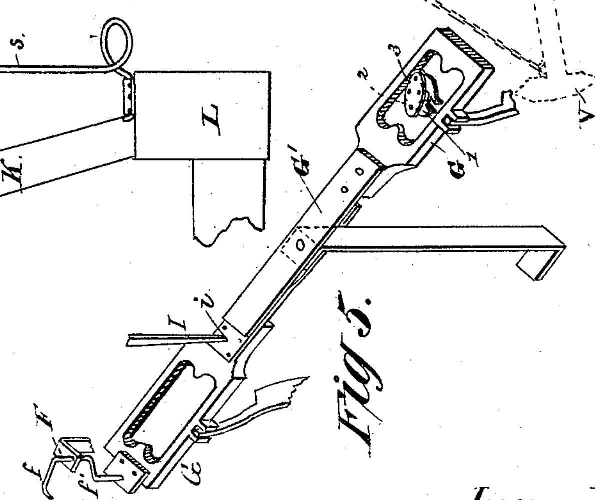
Witnesses
L. H. Hopkins
Harry E. Knight
Inventor
Joseph C. Sebring
By Knight Bros
Attys.
N. PETERS, Photo-Lithographer, Washington, D. C.

(No Model.)

4 Sheets—Sheet 3.

J. C. SEBRING.

COMBINED PLANTER AND CULTIVATOR.

No. 251,301.

Patented Dec. 20, 1881.

Witnesses
L. H. Hopkins
Harry E. Knight

Inventor
Joseph C. Sebring
By Knight Bros
Attys

N. PETERS, Photo-Lithographer, Washington, D. C.

(No Model.) 4 Sheets—Sheet 4.
J. C. SEBRING.
COMBINED PLANTER AND CULTIVATOR.
No. 251,301. Patented Dec. 20, 1881.
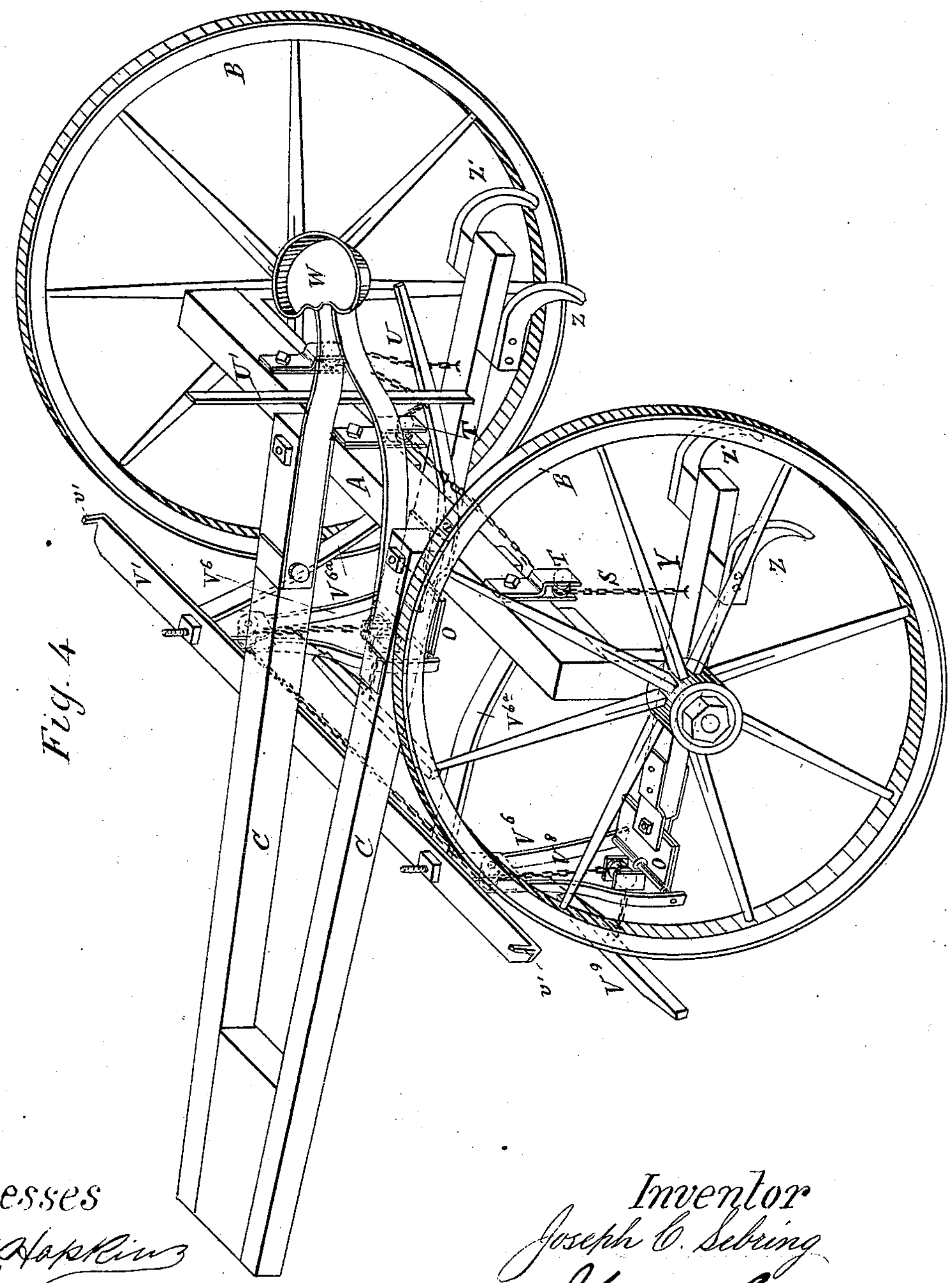
Witnesses
Benj. Hopkins
Harry E. Knight
Inventor
Joseph C. Sebring
By Knight Bros
Attys.
N. PETERS, Photo-Lithographer, Washington, D. C.

UNITED STATES PATENT OFFICE.

JOSEPH C. SEBRING, OF BISMARCK, KANSAS.

COMBINED PLANTER AND CULTIVATOR.

SPECIFICATION forming part of Letters Patent No. 251,301, dated December 20, 1881.

Application filed January 8, 1881. (No model.)

*To all whom it may concern:*

Be it known that I, JOSEPH C. SEBRING, a citizen of the United States, residing at Bismarck, in the county of Wabaunsee and State of Kansas, have invented Improvements in Combined Planters and Cultivators, of which the following is a specification.

This invention relates to a machine convertible at will from a corn-planter to a cultivator, and when used as a cultivator adapted for the replanting of corn by the adjustment of a seeding apparatus in the center of the cultivator, as hereinafter described.

The invention consists in a certain novel construction and arrangement of parts, as hereinafter described and claimed.

In order that the invention may be fully understood, I will proceed to describe it with reference to the accompanying drawings, in which—

Figure 1:
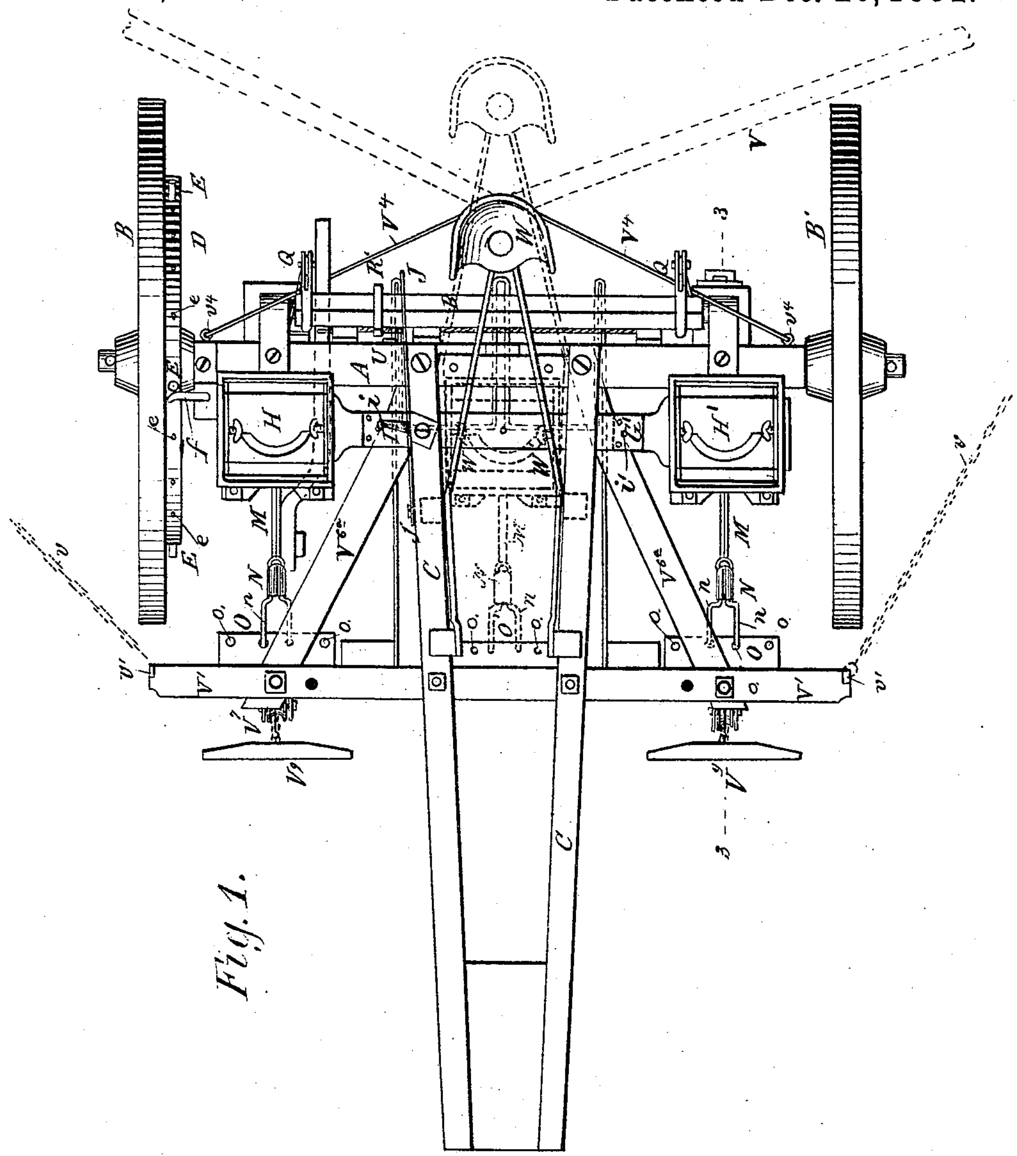
Figure 3:
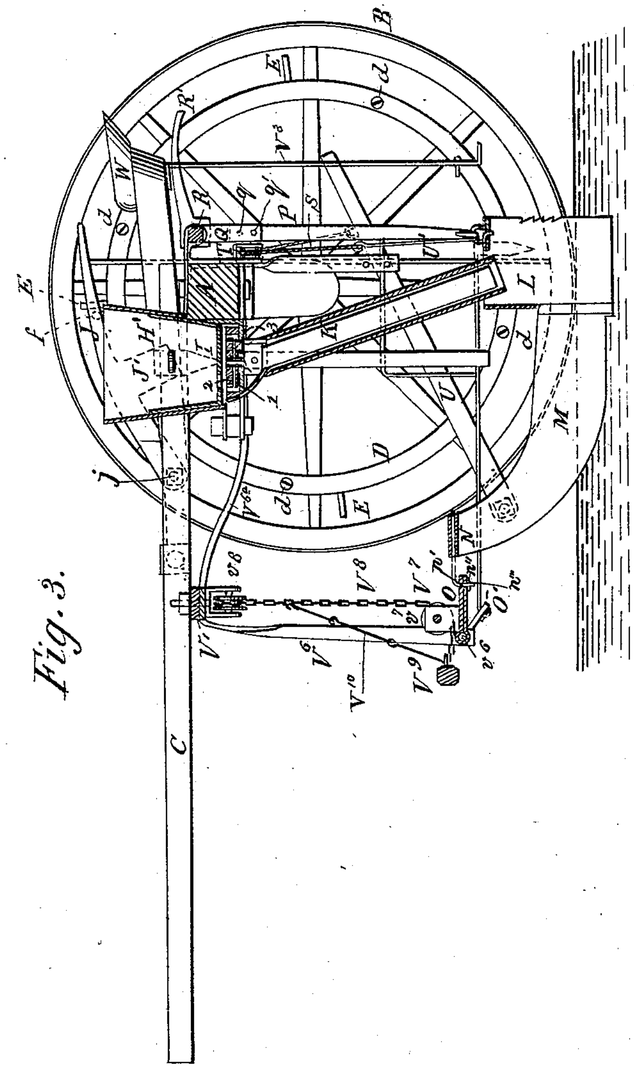

Figure 1 is a plan of a combined seeder and cultivator illustrating the invention. Fig. 2 is a rear view of the same. Fig. 3 is a vertical section on the line 3 3, Figs. 1 and 2. Fig. 4 is a perspective view, illustrating the machine as a cultivator. Fig. 5 is a sectional perspective view of the hopper plates or disks employed for planting corn singly in drills, as hereinafter described. Fig. 6 is a side view of the spring which holds the replanter in elevated position.

A represents an axle, supported on wheels B B′, B being the driving-wheel, and carrying a tappet-ring, D, provided with radial studs or teeth E, which engage successively with the arm *f* of the vertical rock-shaft F, which carries at its lower end a second arm, *f′*, connected with the grain-slide G, which works in the bottom of hoppers H H′ in customary manner, and is pressed endwise by the spring I, whose free end is inserted in the hole *i* in the slide in opposition to the movement imparted by the tappet-teeth E and rock-shaft F. The tappet-ring D has a circular adjustment, and is fixed in any position by set-screws *d*, so as to regulate the position of the tappet-teeth and cause them to drop the hills of corn at the required points. The said tappet-teeth are set closer together or farther apart to regulate the distance of the hills, and may be increased in number as required, a sufficient number being inserted when desired to adapt the machine for planting in drills. *e* are holes for receiving the studs or teeth E.

To adapt the machine for planting corn in drills, one kernel in a place, the ordinary measuring disk, which is pierced for dropping corn four or five kernels together, is removed and is replaced by two thin disks, 1 2, Fig. 5, the lower disk, 1, being stationary, and being made with a small aperture for the purpose of reducing the size of the opening in the hopper-bottom, and the upper one, 2, constituting the reciprocating dropper-disk, which is operated by the slide G, and has an aperture, 3, of suitable size to pass a single kernel of corn at a time.

In order to place the seeding mechanism out of gear with the tappet-wheel, I employ a stop-lever, J, pivoted at *j* to the frame, and provided with a plate or arm, J′, which, when the lever is drawn over backward and pressed down, bears against the face of the spring I, so as to hold the seeder-slide G in retracted position.

Attached to the bottom of the hoppers H are conducting-tubes K K, which may be of metal, and extend downward within boots L L, formed on or attached to the rear extremities of the shares or furrow opening shoes M M, which latter are connected in front by clevises N to hinged draft-plates O or rods $V^6$, said plates being provided with a plurality of holes, *o*, for the reception of the clevises N, in order that the shares may be set at any required distance asunder. The clevises consist of bars *n n*, formed with hooks *n′ n′*, and secured by nuts *n″ n″* on their screw-threaded ends *n‴ n‴*. The boots L are attached to the rear of the shoes M, and are raised or lowered as required by connecting rods or bars P, pivoted at their upper ends to arms Q on a rock-shaft, R, the rods being so proportioned that, when the arms Q are turned down into their lowermost position, by drawing back the lever R′ of the rock-shaft R, the said arms Q, passing beyond their centers, will hold the shoes rigidly down in their operative position in the ground. In order to raise the shoes and support them in their upper and inoperative position when required, suspension cords or chains S are applied in addition to the connecting rods or bars P, passing over pulleys T, and connected to a foot-lever, U, which is held down, when required, by a stop-bar, U′, in order to support the shares in their elevated position. Each pair of arms Q is provided with a series of perforations, $q$, which receive cross-pins $q'$, passing through a corresponding series of perforations, $p$, in their rod or bar P. The same appliance is employed in connection with the cultivator-beams for raising the latter when the machine is used as a cultivator, as illustrated in Fig. 4, and as hereinafter described.

V represents a row-marker, which may be applied to the machine or removed at will by hitching the forward end of its draft-rod $v$ over a hook, $v'$, prepared for it on either extremity of a rigid frame, V′, and attaching its lateral stay-bar $V^2$ to a pendant, $V^3$, projecting rigidly downward from the driver's seat W, as shown, an effective lateral brace being provided by a rod, $V^4$, attached to the lower end of the pendant $V^3$, where the rigid stay-bar $V^2$ is connected therewith and hooked at its other end in a staple, $v^4$, on the heel of the spindle of the axle A. This marker attachment may be applied at will on either side of the machine, as illustrated in full lines and dotted lines in Figs. 1 and 2.

X represents an automatic hill-marker for indicating the position in the rows of the last pair of hills, as I have described in an earlier application for Letters Patent.

The tongue C is bifurcated, as shown, rigidly secured to the axle A, and forms an attachment for the rigid frame V′, above referred to, to which frame are connected rigid pendants $V^6$, each having rearwardly-extending portions branching downward, and receiving at their lower ends pivot-rods $v^6$, on which the draft-plates O of the clevises N are mounted and turn. To the said pivot-pins $v^6$ are also hinged sheave-blocks $V^7$ for the reception of draft-chains $V^8$, which pass around the sheaves $v^7$ in said blocks and up over additional sheaves, $v^8$, mounted beneath the rigid frame V′, thus forming a connection between the whiffletrees $V^9$, which are attached to the extremities of said chain $V^8$, which connection is carried up to about the height of the axle in order to avoid contact with the growing corn even after the same has reached a considerable height at the time of the second or third cultivation. From the rear side of each of the whiffletrees $V^9$ is attached a supporting rod or chain, $V^{10}$, extending to the chain $V^8$, near its sheave $v^8$.

For replanting during the first cultivation, when the growing corn is small, I employ a central draft-plate, O′, pierced in the same manner as the plates O, for the reception of the clevis N of one of the seeding-shares, which share is thus placed in the center of the machine, beneath one of the seed-boxes, which is likewise set in central position above the said share, between the forks of the tongues C C and the forked frame W′ of the driver's seat, which is attached to said tongue. The seed-slide G for this purpose is made in two parts, secured together, the part G′, with its accompanying seed-box H′, being adjusted on the other part, and the spring I inserted in the hole $i'$, and the second arm, $f'$, of the vertical rock-shaft F engaged with the inner end of the part G′ after the removal of the other part of the slide and the seed-box at that end.

In replanting in the first cultivation I employ a spring, $s$, to raise and support the seeding share and boot, so that they may be held up out of the way of the corn when not required, and they are readily thrown down into operative position by the driver's foot when a hill is to be planted, the stop-lever J being raised and rested on top of the bar U′ to release the seeder-slide, and thus throw the dropping mechanism in gear.

At Y Y in Fig. 4 are shown the cultivator-beams, which are attached to the draft-plates O in place of the seeder-shares when the machine is converted into a cultivator. The said cultivator-beams and their attached shares Z Z′ are also employed for planting in grassy ground, the dropping-tube being placed in the rear of the first share, Z, and in front of the second share, Z′, and between the paths of the two, so that the seed will be dropped in the fresh ground opened by the first share and covered by the action of the second share.

A loop, 7, formed at the back of the top plate of the boot L, or attached thereto by a bolt or otherwise, forms a stirrup in riding, or may, when the machine is used as a walking-planter, receive a bar or handle for pressing the share and boot down to and into the ground when a hill is to be replanted, a stop-rod serving to gage the depth. This is illustrated in Fig. 2.

The cultivator-frames may have handles for use when walking and the customary stirrups for use in riding.

Having thus described my invention, the following is what I claim as new therein and desire to secure by Letters Patent:

1. The combination of the pendant $V^3$ and brace-rods $V^4$, extending from pendant to staples on the heels of the spindles, and a marker, V, as set forth.

2. The combination of the rigid frames V′, bifurcated pendants $V^6$ $V^6$, sheave-blocks $V^7$ $V^7$, single draft-chain $V^8$, sheaves $v^7$ $v^7$, frame-sheaves $v^8$ $v^8$, whiffletrees $V^9$, and supporting rod or chain $V^{10}$, as set forth.

3. The seed-hopper H′ and seed-slide G G′, having hole $i'$, adapted to be adjusted for replanting, as set forth.

4. In combination with the replanting-hopper H′, seed-slide G G′, having hole $i'$, the spring I, tube K, boot L, shoe M, elevating-spring $s$, and stirrup 7.

JOSEPH C. SEBRING.

Witnesses:
OCTAVIUS KNIGHT,
HARRY E. KNIGHT.